(12) United States Patent
Khajeh et al.

(10) Patent No.: US 11,422,113 B2
(45) Date of Patent: *Aug. 23, 2022

(54) ULTRASONIC WATER-AGNOSTIC TOUCH DETECTION SENSOR

(71) Applicant: Apple Inc., Cupertino, CA (US)

(72) Inventors: Ehsan Khajeh, Los Gatos, CA (US); Brian Michael King, Saratoga, CA (US); George Ho Yin Mak, Santa Clara, CA (US); Marcus Yip, San Carlos, CA (US); Giovanni Gozzini, Berkeley, CA (US)

(73) Assignee: Apple Inc., Cupertino, CA (US)

( * ) Notice: Subject to any disclaimer, the term of this patent is extended or adjusted under 35 U.S.C. 154(b) by 161 days.

This patent is subject to a terminal disclaimer.

(21) Appl. No.: 16/917,779

(22) Filed: Jun. 30, 2020

(65) Prior Publication Data

US 2021/0404991 A1 Dec. 30, 2021

(51) Int. Cl.
| | |
|---|---|
| *G01N 29/04* | (2006.01) |
| *G01N 29/24* | (2006.01) |
| *G01N 29/34* | (2006.01) |
| *G06F 3/043* | (2006.01) |
| *G06F 3/041* | (2006.01) |
| *G01V 1/00* | (2006.01) |

(52) U.S. Cl.
CPC ....... *G01N 29/041* (2013.01); *G01N 29/2437* (2013.01); *G01N 29/348* (2013.01); *G01V 1/001* (2013.01); *G06F 3/0418* (2013.01); *G06F 3/0433* (2013.01); *G01N 2291/0422* (2013.01); *G01N 2291/106* (2013.01)

(58) Field of Classification Search
CPC ............ G01N 29/041; G01N 29/2437; G01N 29/348; G01V 1/001; G06F 3/0418; G06F 3/0433
See application file for complete search history.

(56) References Cited

U.S. PATENT DOCUMENTS

| | | |
|---|---|---|
| 5,591,945 A | 1/1997 | Kent |
| 6,060,812 A | 5/2000 | Toda |
| 6,091,406 A | 7/2000 | Kambara et al. |

(Continued)

OTHER PUBLICATIONS

Notice of Allowance received for U.S. Appl. No. 17/219,758, dated Sep. 17, 2021, 11 pages.

*Primary Examiner* — Tarun Sinha
(74) *Attorney, Agent, or Firm* — Kubota & Basol LLP

(57) ABSTRACT

An ultrasonic touch sensing system that uses both compressional and shear waves for touch and water detection is disclosed. When no touch or water is present, less shear and compressional wave energy is absorbed, so both shear and compressional wave reflections do not have significant amplitude decreases. When a finger is in contact with the sensing plate, both shear and compressional wave energy is absorbed, so both shear and compressional wave reflections have significant amplitude decreases. When water is in contact with the sensing plate, compressional energy is absorbed but little or no shear wave energy is absorbed, so while compressional wave reflections have significant amplitude decreases, shear wave reflections do not. From these amplitudes, a determination can be made as to whether no touch is present on the sensing plate, whether a touch is present on the sensing plate, or whether water is present on the sensing plate.

21 Claims, 9 Drawing Sheets

(56) References Cited

U.S. PATENT DOCUMENTS

| | | | |
|---|---|---|---|
| 7,006,081 B2 | 2/2006 | Kent et al. | |
| 11,231,816 B2* | 1/2022 | Khajeh | G06F 3/0446 |
| 2004/0168516 A1 | 9/2004 | Kent | |
| 2004/0246239 A1 | 12/2004 | Knowles et al. | |
| 2016/0274067 A1* | 9/2016 | Walker | G01N 29/4418 |
| 2016/0345113 A1 | 11/2016 | Lee et al. | |
| 2018/0032211 A1 | 2/2018 | King et al. | |
| 2019/0121460 A1 | 4/2019 | Ting | |
| 2019/0235656 A1 | 8/2019 | Khajeh et al. | |
| 2019/0243047 A1 | 8/2019 | Khajeh et al. | |
| 2019/0354210 A1 | 11/2019 | Akhbari et al. | |
| 2019/0354238 A1 | 11/2019 | Akhbari et al. | |
| 2020/0333914 A1 | 10/2020 | Khajeh et al. | |
| 2021/0405809 A1 | 12/2021 | Khajeh et al. | |

\* cited by examiner

ULTRASONIC WATER-AGNOSTIC TOUCH DETECTION SENSOR

FIELD OF THE DISCLOSURE

This relates generally to touch sensing and, more particularly, to ultrasonic water-agnostic touch detection systems capable of detecting touches and also water on a detection surface.

BACKGROUND OF THE DISCLOSURE

Many types of input mechanisms are presently available for performing operations in a computing system, such as buttons or keys, mice, trackballs, joysticks and the like. Touch-sensitive surfaces, and touch screens in particular, have become extremely popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch.

With touch-sensitive surfaces being incorporated into more and more devices, the types of physical and ambient environments in which they are expected to operate are also increasing. For example, touch sensing capability is desired in devices where water or other liquid may be present, and there is increasing interest in incorporating touch sensing into thicker sensing surfaces and metal sensing surfaces. However, capacitive-type touch sensing systems can experience reduced performance due to electrically floating objects (e.g., water droplets) in contact with the touch-sensitive surface, which may not be distinguishable from an actual touch. In addition, capacitive-type touch sensing systems can have difficulty detecting touches on metal touch surfaces, and on thick touch surfaces. Force sensing, on the other hand, can detect an actual touch and ignore water or other liquids, but may not work well on thick or metal surfaces, because these types of surfaces may be stiff enough to resist the bending or compression needed for accurate force sensing.

SUMMARY

This relates to an ultrasonic touch sensing system that uses both compressional wave and shear waves for improved touch and water (or other liquid) detection. For example, an ultrasonic shear transducer can transmit a shear wave through a sensing plate (e.g., cover glass), and can also generate a parasitic compressional wave as well. The shear and compressional waves react differently when a touch or water (or other liquid) is present on the sensing plate. When a finger is in contact with the sensing plate, both shear and compressional wave energy is absorbed and the reflections of both the shear wave and the compressional wave can significantly decrease in amplitude. In contrast, when water (or other liquid) is in contact with the sensing plate, compressional energy is absorbed and the reflection of the compressional wave can significantly decrease in amplitude, while little or no energy from the shear wave is absorbed, so the reflection of the shear wave can be received without a significant decrease in amplitude. In addition, one or more of the ultrasonic stimulation center frequency, stimulation frequency spectrum, type of material and the thickness of the material can be selected such that reflections of the shear and compressional waves can be received at different time periods. The amplitude of the reflections from the shear waves and the amplitude of the reflections from the compressional waves can be measured within those different time periods. From these amplitudes, a determination can be made as to whether no touch is present on the sensing plate, whether a touch is present on the sensing plate, or whether water (or other liquid) is present on the sensing plate. When a plurality of ultrasonic shear transducers are employed, such as in an array, the location of the touch or water can also be determined.

DETAILED DESCRIPTION

In the following description of various examples, reference is made to the accompanying drawings which form a part hereof, and in which it is shown by way of illustration specific examples that can be practiced. It is to be understood that other examples can be used and structural changes can be made without departing from the scope of the various examples.

Examples of the disclosure are directed to an ultrasonic touch sensing system that uses both compressional wave and shear waves for improved touch and water (or other liquid) detection. For example, an ultrasonic shear transducer can transmit a shear wave through a sensing plate (e.g., cover glass), and can also generate a parasitic compressional wave as well. The shear and compressional waves react differently when a touch or water (or other liquid) is present on the sensing plate. When a finger is in contact with the sensing plate, both shear and compressional wave energy is absorbed and the reflections of both the shear wave and the compressional wave can significantly decrease in amplitude. In contrast, when water (or other liquid) is in contact with the sensing plate, compressional energy is absorbed and the reflection of the compressional wave can significantly decrease in amplitude, while little or no energy from the shear wave is absorbed, so the reflection of the shear wave can be received without a significant decrease in amplitude. In addition, one or more of the ultrasonic stimulation center frequency, stimulation frequency spectrum, type of material and the thickness of the material can be selected such that reflections of the shear and compressional waves can be received at different time periods. The amplitude of the reflections from the shear waves and the amplitude of the reflections from the compressional waves can be measured within those different time periods. From these amplitudes, a determination can be made as to whether no touch is present on the sensing plate, whether a touch is present on the sensing plate, or whether water (or other liquid) is present on the sensing plate. When a plurality of ultrasonic shear transducers are employed, such as in an array, the location of the touch or water can also be determined. Note that although the term "water" may be primarily used herein for brevity, it should be understood that examples of the disclosure are not limited to the detection of water, but include the detection of liquids other than water.

Figure 1A:
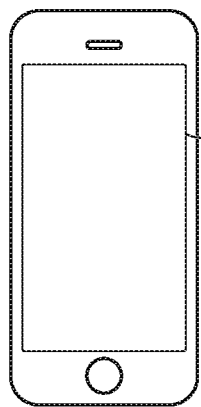
FIGS. 1A-1E illustrate electronic devices that can include ultrasonic touch and water detection according to examples of the disclosure.
Figure 1B:
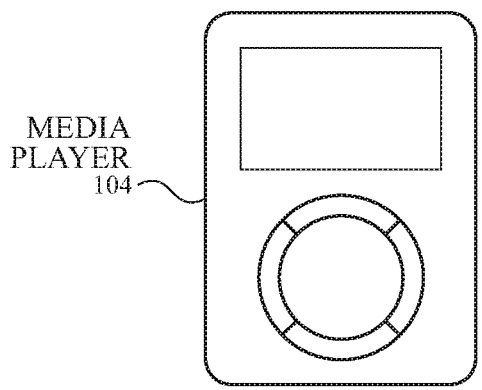
Figure 1C:
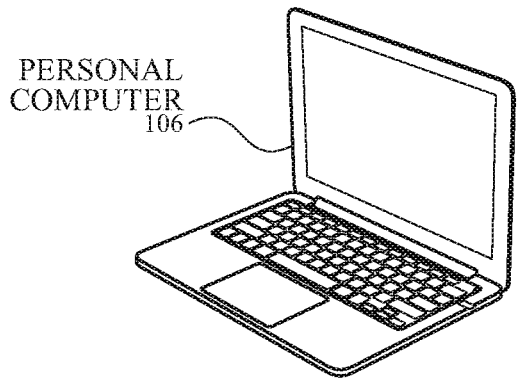
Figure 1D:
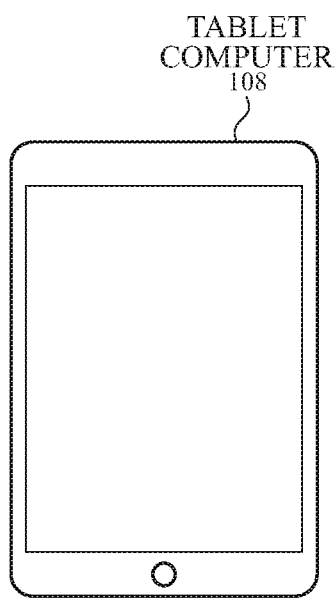
Figure 1E:
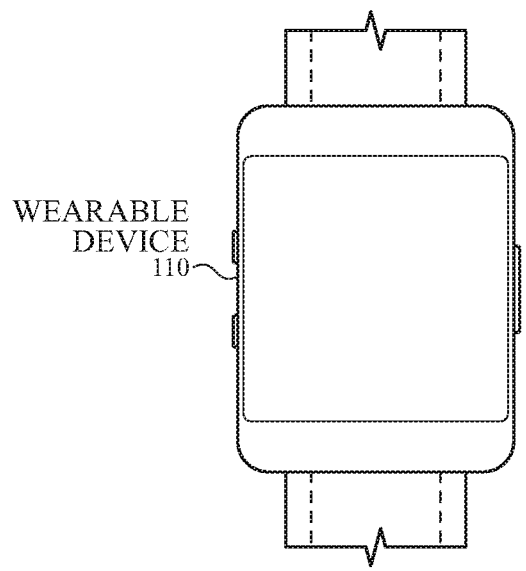

FIGS. 1A-1E illustrate electronic devices that can include ultrasonic touch and water detection according to examples of the disclosure. FIG. 1A illustrates mobile telephone 102 that can include ultrasonic touch and water detection according to examples of the disclosure. FIG. 1B illustrates digital media player 104 that can include ultrasonic touch and water detection according to examples of the disclosure. FIG. 1C illustrates personal computer 106 that can include ultrasonic touch and water detection according to examples of the disclosure. FIG. 1D illustrates tablet computing device 108 that can include ultrasonic touch and water detection according to examples of the disclosure. FIG. 1E illustrates wearable device 110 (e.g., a watch) that can include ultrasonic touch and water detection according to examples of the disclosure. It should be understood that the example devices illustrated in FIGS. 1A-1E are provided as examples, and other types of devices can include ultrasonic touch and water detection according to examples of the disclosure.

Ultrasonic sensors can be incorporated in the above-described devices to add touch and water sensing capabilities to a touch sensing surface of the system. For example, in some examples, an ultrasonic touch sensing system can replace or augment a touch screen (e.g., capacitive, resistive, etc.) to provide touch sensing capability in wet environments or under conditions where the device may get wet (e.g., exercise, swimming, rain, washing hands). In some examples, an otherwise non-touch-sensitive display screen can be augmented with ultrasonic sensors to provide touch sensing capability. In such examples, a touch-sensitive display can be implemented without the stack-up required for a capacitive touch screen. In some examples, the ultrasonic sensors can be used to provide touch sensing capability for a non-display surface. For example, the ultrasonic sensors can be used to provide touch sensing capabilities for a track pad, a button, a scroll wheel, part or all of the housing or any other surfaces of the device (e.g., on the front, rear or sides).

Figure 2:
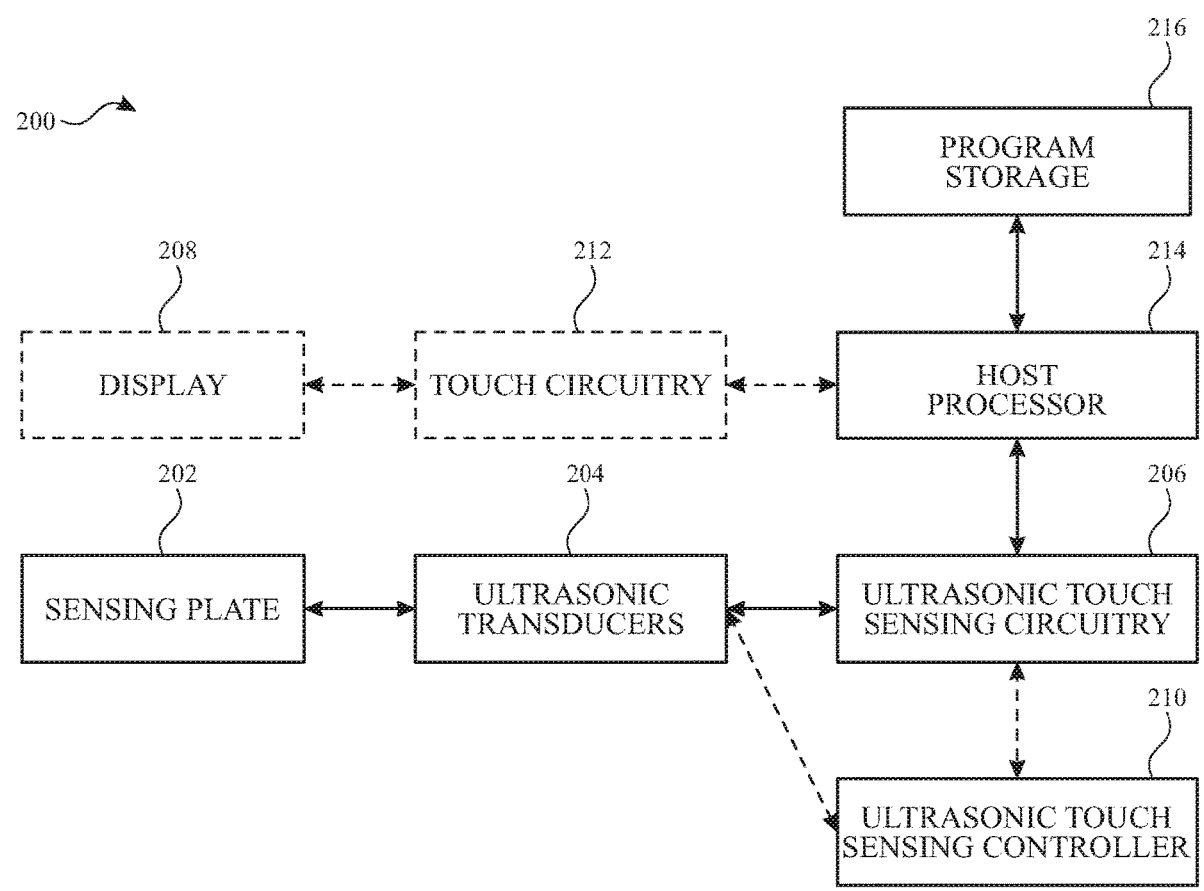
FIG. 2 illustrates a block diagram of an electronic device including an ultrasonic touch and water sensing system according to examples of the disclosure.

FIG. 2 illustrates a block diagram of an electronic device including an ultrasonic touch and water sensing system according to examples of the disclosure. In some examples, sensing plate 202 of device 200 (which can correspond to devices 102, 104, 106, 108 and 110 above) can be coupled with one or more ultrasonic transducers 204. In some examples, ultrasonic transducers 204 can be piezoelectric shear wave transducers, which can be made to vibrate by the application of electrical signals when acting as a transmitter, and can generate electrical signals based on detected vibrations when acting as a receiver. In some examples, ultrasonic transducers 204 can be formed from a piezoelectric ceramic material (e.g., lead zirconate titanate (PZT) or potassium sodium niobate (KNN)) or a piezoelectric plastic material (e.g., polyvinylidene fluoride (PVDF)). In some examples, ultrasonic transducers 204 can be bonded to sensing plate 202 by a bonding agent (e.g., a thin layer of stiff epoxy). In some examples, ultrasonic transducers 204 can be deposited on the surface of sensing plate 202 through processes such as deposition, lithography, or the like. In some examples, ultrasonic transducers 204 can be bonded to the surface of sensing plate 202 using conductive or non-conductive bonding materials. When electrical energy is applied to ultrasonic transducers 204, it can cause the transducers and any material in contact with the transducers to vibrate, and the vibrations of the molecules of the material can propagate as an ultrasonic wave in various modes through sensing plate 202.

In some examples, sensing plate 202 can be partially or completely disposed under or within display 208 (e.g., an Organic Light Emitting Diodes (OLED) display), with dashed lines indicating its optional existence. In some examples, touch circuitry 212 can also be partially or completely disposed under or within display 208 to form a touch screen (e.g., capacitive), and ultrasonic transducers 204 can be partially or completely disposed on (or coupled to) a portion of the touch screen. For example, the touch screen may comprise a glass or plastic panel (sensing plate), and a display region of the touch screen may be surrounded by a non-display region (e.g., a black border region surrounding the periphery of the display region of touch screen). In some examples, ultrasonic transducers 204 can be disposed partially or completely in the black mask region of the touch screen panel (e.g., on the back side of the panel behind the black mask) such that the transducers are not visible (or are only partially visible) to a user. In other examples, ultrasonic transducers 204 can be partially or completely disposed under or behind a trackpad, or under one or more sides or back of the housing.

Device 200 can further comprise ultrasonic touch sensing circuitry 206, which can include circuitry for driving electrical signals to stimulate vibration of ultrasonic transducers 204 (e.g., transmit circuitry), as well as circuitry for sensing electrical signals output by the transducers (e.g., receive circuitry) when the transducer is stimulated by received ultrasonic energy. In some examples, timing operations for ultrasonic touch sensing circuitry 206 can optionally be provided by a separate ultrasonic touch sensing controller 210 that can control timing of the ultrasonic touch sensing circuitry operations. In some examples, ultrasonic touch sensing controller 210 can be coupled between ultrasonic touch sensing circuitry 206 and host processor 214. In some examples, controller functions can be integrated with ultrasonic touch sensing circuitry 206 (e.g., on a single integrated circuit). Output data from ultrasonic touch sensing circuitry 206 can be output to host processor 214 for further processing to determine a touch or water in contact with the device, as will be described in more detail below. In some examples, the processing for determining a touching object or water can be performed by ultrasonic touch sensing circuitry 206, ultrasonic touch sensing controller 210 or a separate subprocessor of device 200 (not shown).

Device 200 can also include an optional touch controller (not shown) in addition to optional touch circuitry 212. In examples including a touch controller, the touch controller can be disposed between touch circuitry 212 and host processor 214. Touch circuitry 212 can, for example, be capacitive or resistive touch sensing circuitry, and can be used to detect contact and/or hovering of objects (e.g., fingers, styli) in contact with and/or in proximity to the touch screen, particularly in the display region of the touch screen. Thus, device 200 can include multiple types of sensing circuitry (e.g., touch circuitry 212 and ultrasonic transducers 204) for detecting objects (and in some instances their positions) in different regions of the device and for different purposes, as will be described in more detail below.

Host processor 214 can receive ultrasonic outputs from ultrasonic touch sensing circuitry 206 or other touch outputs (e.g., capacitive) from touch circuitry 212 and perform actions based on the touch outputs. Host processor 214 can also be connected to program storage 216 and display 208. Host processor 214 can, for example, communicate with display 208 to generate an image on the display, such as an image of a UI, and can use touch sensing circuitry 212 and/or ultrasonic touch sensing circuitry 206 (and, in some examples, their respective controllers) to detect a touch on or near the touch screen, such as a touch input to the displayed UI. The touch input can be used by computer programs stored in program storage 216 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 214 can also perform additional functions that may not be related to touch processing.

Note that one or more of the functions described herein can be performed by firmware stored in memory and executed by the touch circuitry 212 and/or ultrasonic touch sensing circuitry 206 (or their respective controllers), or stored in program storage 216 and executed by host processor 214. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that device 200 is not limited to the components and configuration of FIG. 2, but can include other or additional components in multiple configurations according to various examples. Additionally, the components of device 200 can be included within a single device or can be distributed between multiple devices. Furthermore, it should be understood that the connections between the components are exemplary, and different unidirectional or bidirectional connections can be included between the components depending on the implementation, irrespective of the arrows shown in the configuration of FIG. 2.

As noted above, examples of the disclosure are directed to an ultrasonic touch sensing system that uses both compressional waves and shear waves for improved touch and water detection. Shear waves, also known as transverse waves, create displacements that are orthogonal to the direction of propagation of a wave. Shear waves (and their reflections) provide advantages when used to detect objects on a surface of a sensing plate, because while their reflections are affected by a touching object, they are (relatively) unaffected by water. Thus, shear waves can be used to detect a touch, without detecting water. In addition, shear waves can effectively detect touches on thick sensing plates and metal sensing plate, and can detect light touches. Thus, shear waves can be used with a number of different sensing plate configurations to make a touch/no-touch determination, providing the advantage of greater flexibility in material type and thickness. However, shear waves cannot be used to affirmatively detect the presence of water.

Ultrasonic transducers also generate ultrasonic energy in modes other than shear modes, such as compressional modes. Compressional waves create displacements that are in the same direction as the propagation of the wave. Unlike shear wave reflections, compressional wave reflections are affected by both touching objects and water. Because compressional waves are affected by water, under certain circumstances they can interact with water and cause attenuation of reflected waves and the introduction of ambiguity between a touch and the presence of water, resulting in errors in the accuracy of the touch sensing and the loss of accurate water-agnostic touch sensing capability. However, rather than treating compressional waves as noise or parasitic waves that are to be suppressed or removed, examples of the disclosure treat the water-detecting property of compressional waves as an advantage, and utilize compressional wave reflections along with shear wave reflections to provide both touch and water detection, and in some examples more accurate touch detection. For example, monitoring the reduction in amplitude or energy of a compressional wave reflection can provide a more robust indication or measurement of whether a touch is present. To make this determination, returning ultrasonic energy in the reflected waves can be received by the transducer, and the ultrasonic energy can be converted to an electrical signal by the transducer to determine the amplitude or energy of the reflected wave.

To perform touch and water detection, examples of the disclosure can determine whether the amplitude or energy of a reflected shear wave is below a first predetermined threshold, and whether the amplitude or energy of a reflected compressional wave is below a second predetermined threshold. If both conditions are satisfied, it can be determined that a touch is present at the sensing plate. However, if the amplitude or energy of the reflected shear wave is above the first predetermined threshold, and the amplitude or energy of the reflected compressional wave is below the second predetermined threshold, it can be determined that water is present at the sensing plate. If the amplitude or energy of the reflected shear wave is above the first predetermined threshold, and the amplitude or energy of the reflected compressional wave is above the second predetermined threshold, it can be determined that no touch or water is present at the sensing plate.

Making these amplitude or energy threshold determinations can be complicated or error-prone because the shear wave and compressional wave reflections often overlap in time. Therefore, examples of the disclosure utilize velocity differences between compressional and shear waves (e.g., for certain materials and thicknesses, compressional waves are about 1.6 to 1.7 times faster than shear waves) to identify windows of time where the shear and compressional wave reflections are separated. Within those windows, the amplitudes or energy levels of shear wave or compressional wave reflections can be measured more accurately, with less interference from other waves.

Figure 3A:
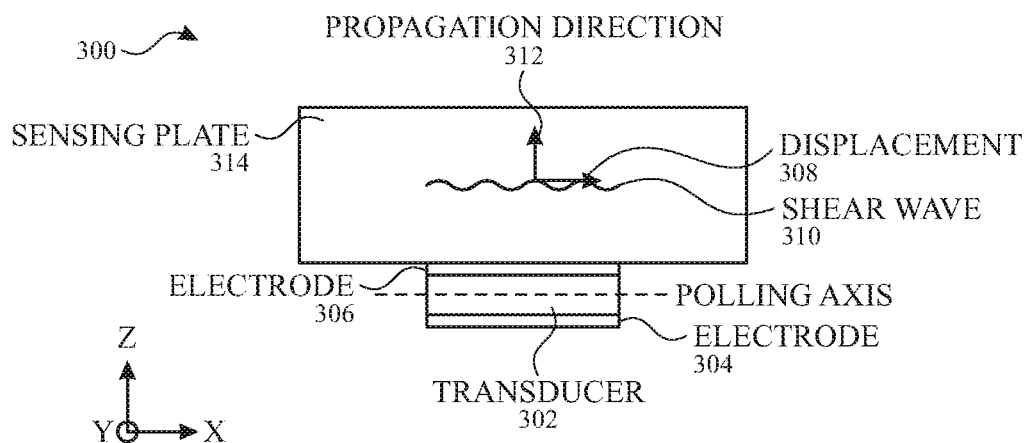
FIG. 3A illustrates a symbolic shear wave transducer implementation generating a shear wave according to examples of the disclosure.

FIG. 3A illustrates a symbolic shear wave transducer implementation 300 generating a shear wave according to examples of the disclosure. In the example of FIG. 3A, shear wave transducer 302 can be oriented along the x-axis (the polling axis) and formed with (e.g., bonded or otherwise coupled to) sensing plate 314. Shear wave transducer 302 can vibrate by repeatedly switching the polarity of a voltage across electrodes 304 and 306 to create displacement 308 along the x-axis, parallel to the sensing plate surface. If the polling direction and electrode configuration are chosen appropriately, shear waves (illustrated symbolically at 310) can be created along the z-axis (in propagation direction 312). However, due to physical imperfections in transducer 302 and electrodes 304 and 306, a parasitic compressional wave can also be propagated in the z-direction.

Figure 3B:
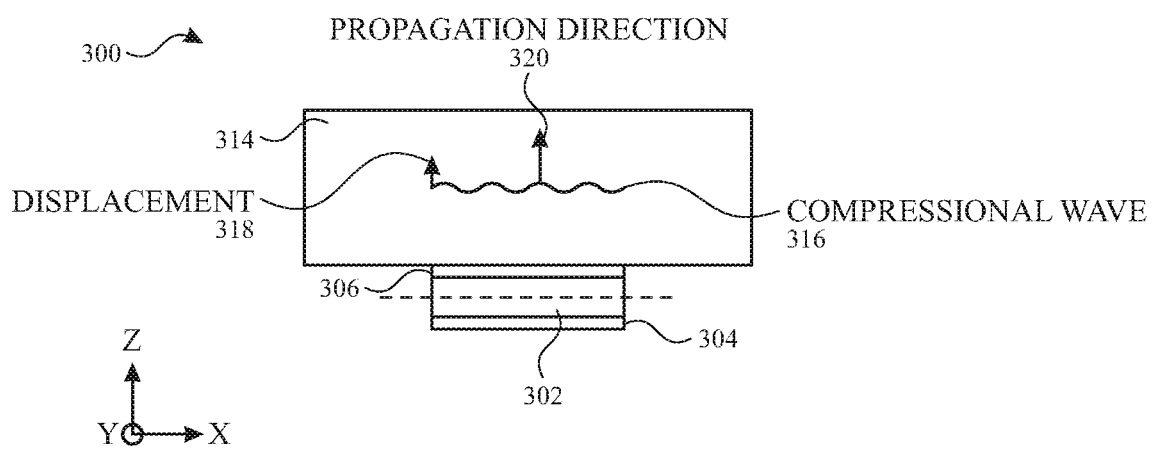
FIG. 3B illustrates a symbolic shear wave transducer implementation generating a compressional wave according to examples of the disclosure.

FIG. 3B illustrates a symbolic shear wave transducer implementation 300 generating a compressional wave according to examples of the disclosure. In the example of FIG. 3B, parasitic compressional wave 316 can be formed due to small unintended displacements 318 of shear wave transducer 302 in the z-direction and corners of the transducer. As can be seen from FIGS. 3A and 3B, both shear wave 310 and parasitic compressional wave 316 generated by shear wave transducer 302 propagate in the z-direction, where an object such as a finger or water may be present on the surface of sensing plate 314. However, as discussed in further detail below, the interactions of shear wave 310 and compressional wave 316 with those objects produce different results.

Figure 4A:
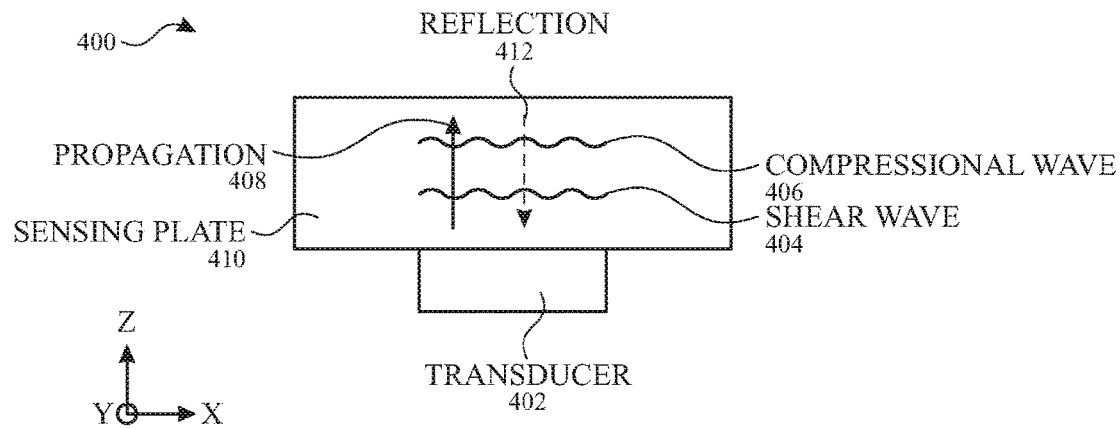
FIG. 4A illustrates a symbolic shear wave transducer implementation with no touching object present according to examples of the disclosure.

FIG. 4A illustrates a symbolic shear wave transducer implementation 400 with no touching object present according to examples of the disclosure. In the example of FIG. 4A, shear wave transducer 402 generates both shear wave 404 and compressional wave 406 as discussed above, both with a z-axis propagation direction 408. In the absence of an object touching sensing plate 410, both shear wave 404 and compressional wave 406 are reflected back to shear wave transducer 402 as shown by reflected wave 412 (symbolically illustrating both separate reflections) with a relatively small drop in amplitude or energy.

Figure 4B:
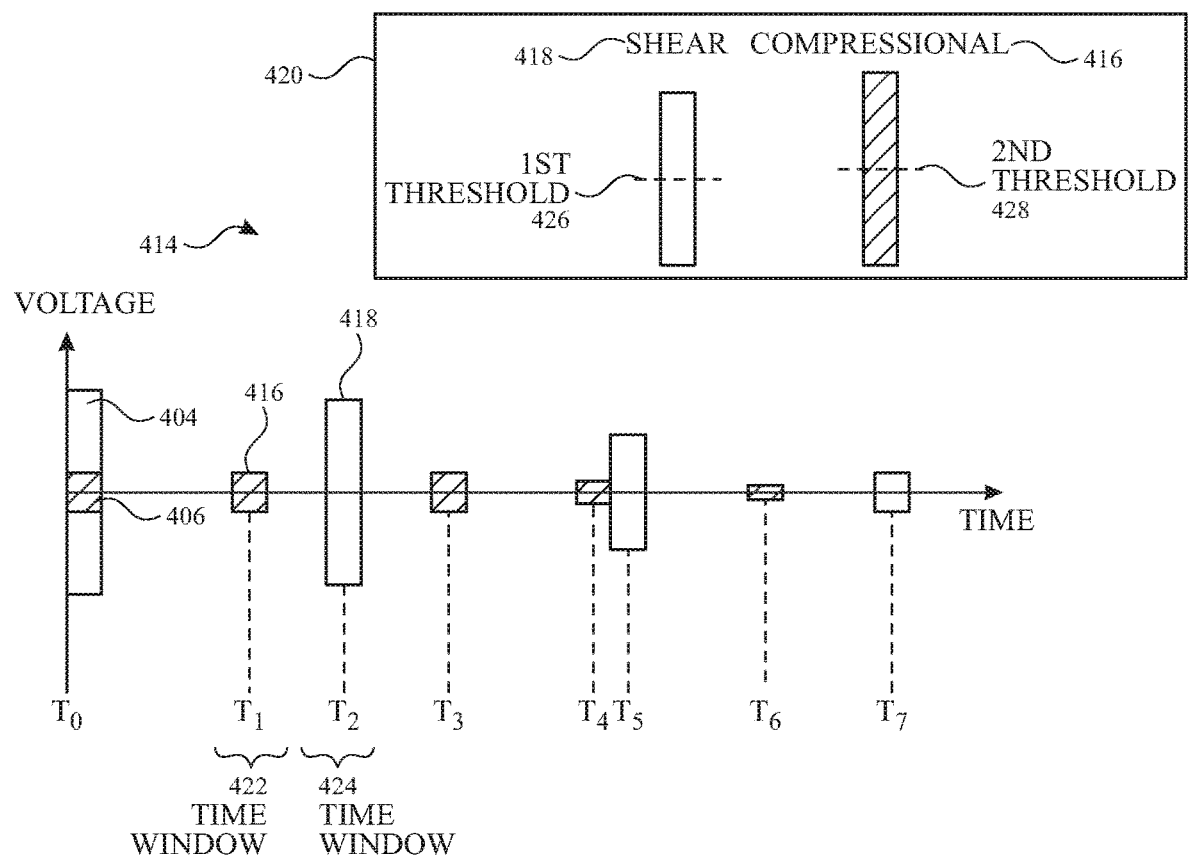
FIG. 4B illustrates a symbolic shear wave transducer reflected wave timing diagram corresponding to the shear wave transducer implementation of FIG. 4A according examples of the disclosure.

FIG. 4B illustrates a symbolic shear wave transducer reflected wave timing diagram 414 corresponding to the shear wave transducer implementation of FIG. 4A according examples of the disclosure. Note that all waves, amplitudes and timing shown in FIG. 4B are symbolic and not to scale. In the example of FIG. 4B, a shear wave transducer can generate both shear wave 404 and compressional wave 406 at time t0, and because of the greater velocity of the compressional wave, a round trip of first compressional wave reflection 416 can be received back at the shear wave transducer at time t1. Next, because of the slower velocity of shear wave 404, a round trip of first shear wave reflection 418 can be received back at the shear wave transducer at time t2. Similarly, subsequent compressional wave reflections can be received back at the shear wave transducer at times t3, t4 and t6, while subsequent shear wave reflections can be received back at the shear wave transducer at times t5 and t7. As shown in the example of FIG. 4B, time window 422 can be determined, empirically or otherwise, to capture the amplitude or energy of first compressional wave reflection 416, and time window 424 can be determined, empirically or otherwise, to capture the amplitude or energy of first shear wave reflection 418. Because no touch is present at sensing plate 410, the amplitude or energy of both first shear wave reflection 418 and first compressional wave reflection 416 can be detected at the shear wave transducer as being above a first threshold 426 and second threshold 428, respectively, as shown in drawing insert 420 in FIG. 4B. Accordingly, no touch may be detected.

Figure 5A:
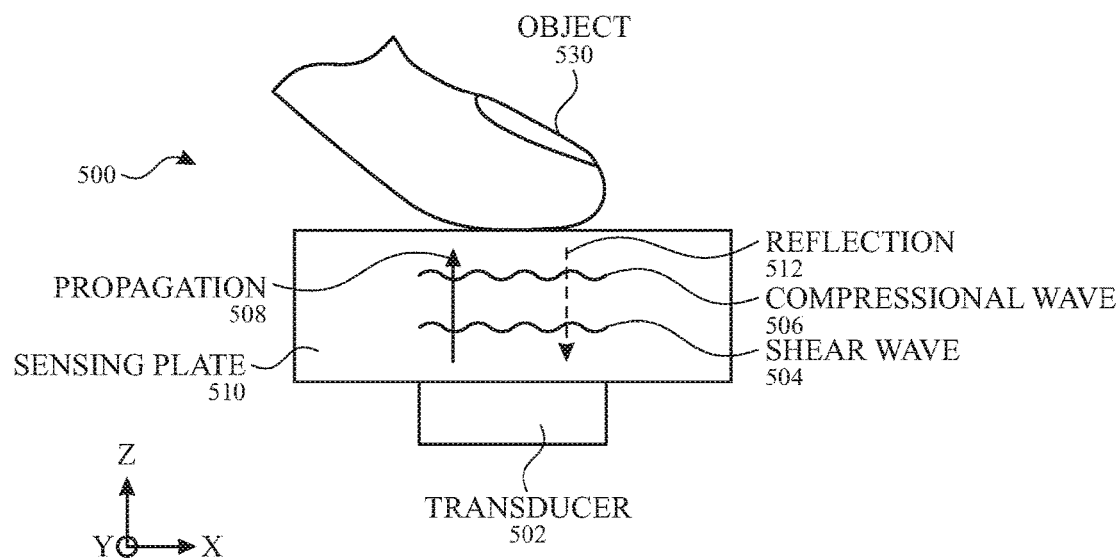
FIG. 5A illustrates a symbolic shear wave transducer implementation with a touching object according to examples of the disclosure.

FIG. 5A illustrates a symbolic shear wave transducer implementation 500 with a touching object according to examples of the disclosure. In the example of FIG. 5A, shear wave transducer 502 generates both shear wave 504 and compressional wave 506 as discussed above, both with a z-axis propagation direction 508. In the presence of object 530 touching sensing plate 510, both shear wave 504 and compressional wave 506 are reflected back to shear wave transducer 502 as shown by reflected wave 512 (symbolically illustrating both separate reflections) with a relatively large drop in amplitude or energy.

Figure 5B:
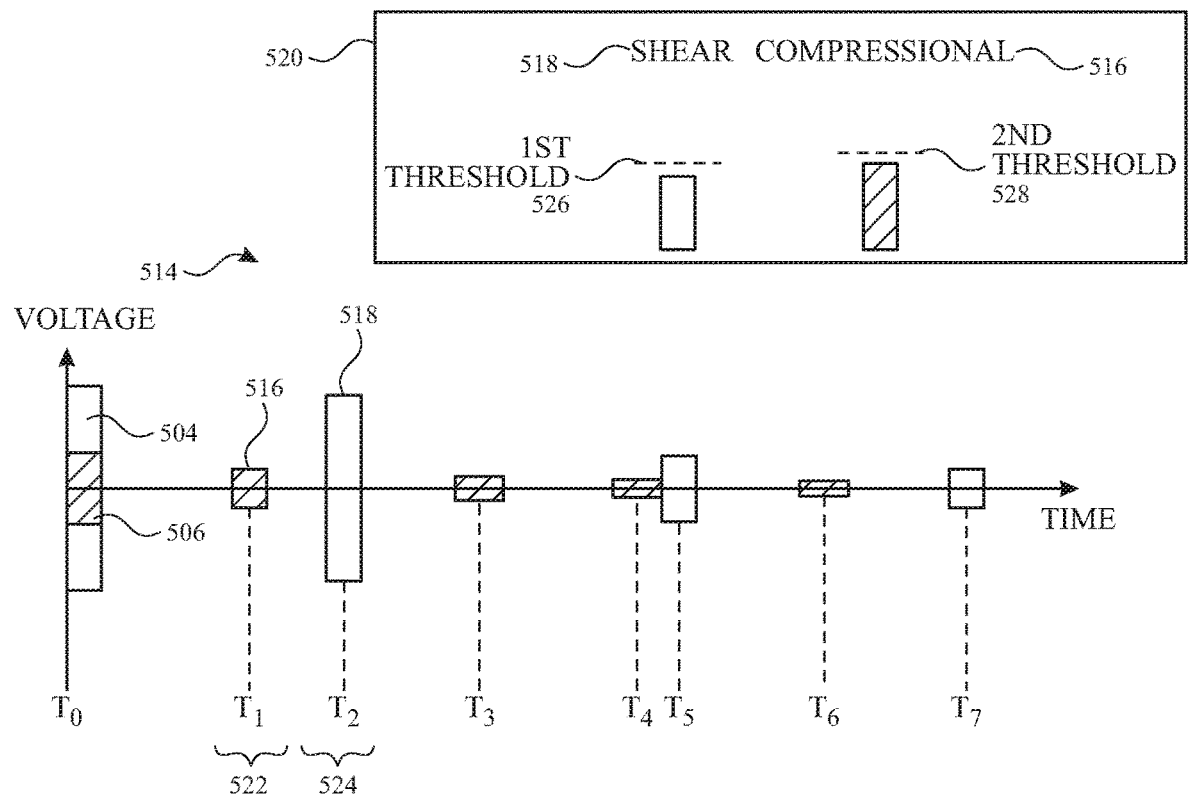
FIG. 5B illustrates a symbolic shear wave transducer reflected wave timing diagram corresponding to the shear wave transducer implementation of FIG. 5A according examples of the disclosure.

FIG. 5B illustrates a symbolic shear wave transducer reflected wave timing diagram 514 corresponding to the shear wave transducer implementation of FIG. 5A according examples of the disclosure. Note that all waves, amplitudes and timing shown in FIG. 5B are symbolic and not to scale. In the example of FIG. 5B, a shear wave transducer can generate both shear wave 504 and compressional wave 506 at time t0, and because of the greater velocity of the compressional wave, a round trip of first compressional wave reflection 516 can be received back at the shear wave transducer at time t1. Next, because of the slower velocity of shear wave 504, a round trip of first shear wave reflection 518 can be received back at the shear wave transducer at time t2. Similarly, subsequent compressional wave reflections can be received back at the shear wave transducer at times t3, t4 and t6, while subsequent shear wave reflections can be received back at the shear wave transducer at times t5 and t7. As shown in the example of FIG. 5B, time window 522 can be determined, empirically or otherwise, to capture the amplitude or energy of first compressional wave reflection 516, and time window 524 can be determined, empirically or otherwise, to capture the amplitude or energy of first shear wave reflection 518. Because touching object 530 is present at sensing plate 510, the amplitude or energy of both first shear wave reflection 518 and first compressional wave reflection 516 can be detected at the shear wave transducer as being below first threshold 526 and second threshold 528, respectively (corresponding to thresholds 426 and 428 in FIG. 4B), as shown in drawing insert 520 in FIG. 5B. Accordingly, a touch may be detected.

Figure 6A:
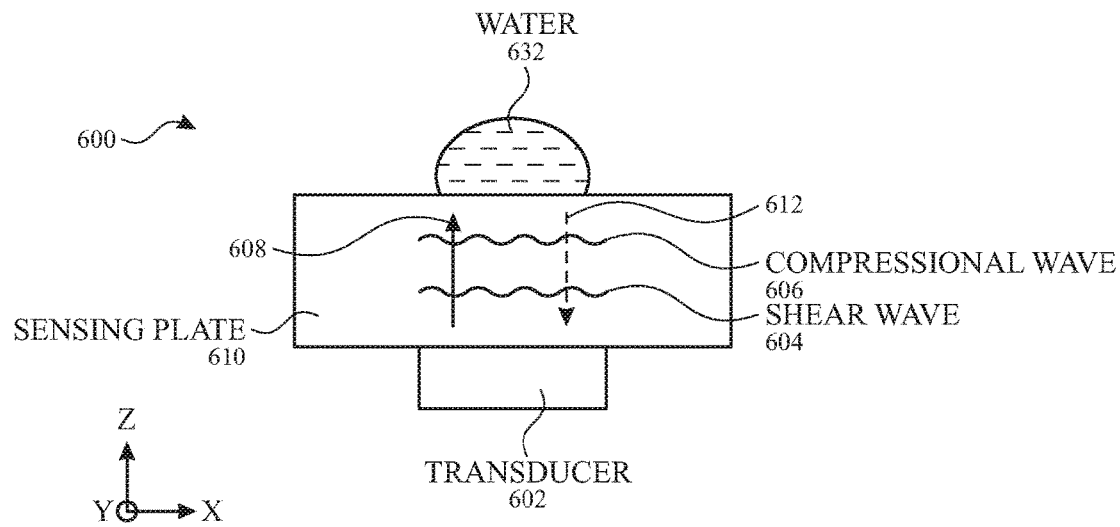
FIG. 6A illustrates a symbolic shear wave transducer implementation with water present according to examples of the disclosure.

FIG. 6A illustrates a symbolic shear wave transducer implementation 600 with water present according to examples of the disclosure. In the example of FIG. 6A, shear wave transducer 602 generates both shear wave 604 and compressional wave 606 as discussed above, both with a z-axis propagation direction 608. In the presence of water 632 touching sensing plate 610, shear wave 604 is reflected back to shear wave transducer 602 as shown by reflected wave 612 (symbolically illustrating both separate reflections) with a relatively small drop in amplitude or energy, while compressional wave 606 is reflected back to the shear wave transducer as shown by reflected wave 612 with a relatively large drop in amplitude or energy.

Figure 6B:
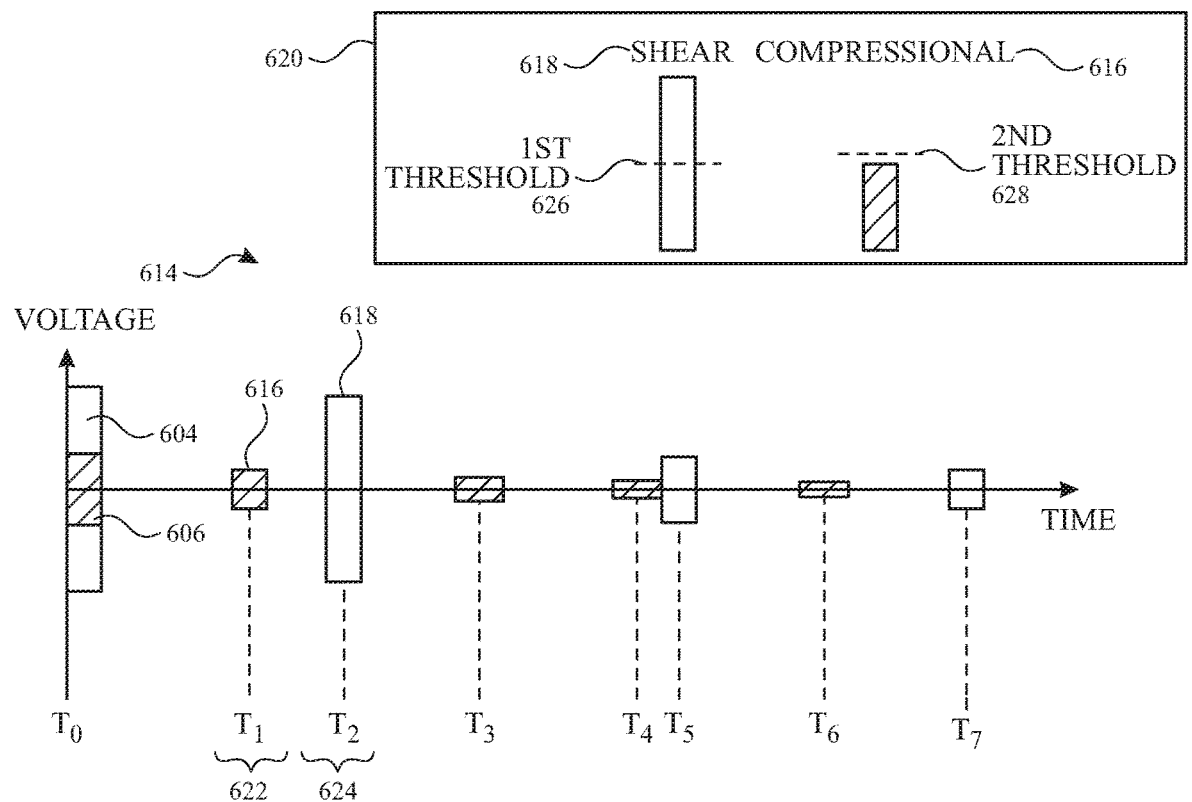
FIG. 6B illustrates a symbolic shear wave transducer reflected wave timing diagram corresponding to the shear wave transducer implementation of FIG. 6A according examples of the disclosure.

FIG. 6B illustrates a symbolic shear wave transducer reflected wave timing diagram 614 corresponding to the shear wave transducer implementation of FIG. 6A according examples of the disclosure. Note that all waves, amplitudes and timing shown in FIG. 6B are symbolic and not to scale. In the example of FIG. 6B, a shear wave transducer can generate both shear wave 604 and compressional wave 606 at time t0, and because of the greater velocity of the compressional wave, a round trip of first compressional wave reflection 616 can be received back at the shear wave transducer at time t1. Next, because of the slower velocity of shear wave 604, a round trip of first shear wave reflection 618 can be received back at the shear wave transducer at time t2. Similarly, subsequent compressional wave reflections can be received back at the shear wave transducer at times t3, t4 and t6, while subsequent shear wave reflections can be received back at the shear wave transducer at times t5 and t7. As shown in the example of FIG. 6B, time window 622 can be determined, empirically or otherwise, to capture the amplitude or energy of first compressional wave reflection 616, and time window 624 can be determined, empirically or otherwise, to capture the amplitude or energy of first shear wave reflection 618. Because water 632 is present at sensing plate 610, the amplitude or energy of first shear wave reflection 618 can be detected at shear wave transducer 602 as being above first threshold 626, and the amplitude or energy of first compressional wave reflection 616 can be detected at shear wave transducer 602 as being below second threshold 628, respectively (corresponding to thresholds 426 and 428 in FIG. 4B), as shown in drawing insert 620 in FIG. 6B. Accordingly, water may be detected.

FIGS. 4A, 4B, 5A, 5B, 6A and 6B show time windows for capturing the first compressional wave reflection and the first shear wave reflection, which are shown with clear time separation (i.e. no overlap). However, as can be seen from the third compressional wave reflection at time t4 and the second shear wave reflection at time t5, the compressional and shear wave reflections do not always have clear time separation, and in some instances the reflections can undesirably overlap. Sensing plate stackups, if any, can also complicate the presence and timing of reflections. For example, if various display layers are present between the shear wave transducer and the sensing plate surface, shear and compressional wave reflections and/or mode conversions can be produced at layer interfaces and other discontinuities, and multiple internal reflections can occur that can make finding appropriate time windows difficult. Examples of the disclosure select one or more of the ultrasonic frequency and shear plate materials and thicknesses to enable a particular compressional wave reflection and a particular shear wave reflection to be identified with sufficient time separation (e.g. no overlap, or minimal overlap between the tails of the shear and compressional waves such that the error resulting from the overlap is below a certain threshold guaranteeing adequate touch detection performance), and because of this time separation, time windows can be identified to separately measure the reflections of both the shear wave and the compressional wave. "Non-overlapping," as used herein, refers to no time overlap, or minimal time overlap such that errors resulting from the overlap are below a certain threshold.

Each material used as a sensing plate has a particular shear and compressional wave velocity at a particular thickness, and this velocity determines when the reflected waves arrive back at the shear wave transducer. In addition, the frequency and bandwidth of the shear and compressional waves determines the time duration of the reflected waves. For example, a low frequency wave over a given number of cycles will have a longer shear and compressional wave reflected pulse duration, which can increase the chance of reflection overlap. Conversely, higher frequency waves over the same number of cycles will have a shorter shear and compressional wave reflected pulse duration, which can decrease the chance of reflection overlap. Thus, consideration of material thickness and frequency can be important considerations in maintaining separation of the shear and compressional wave reflections.

Figure 7A:
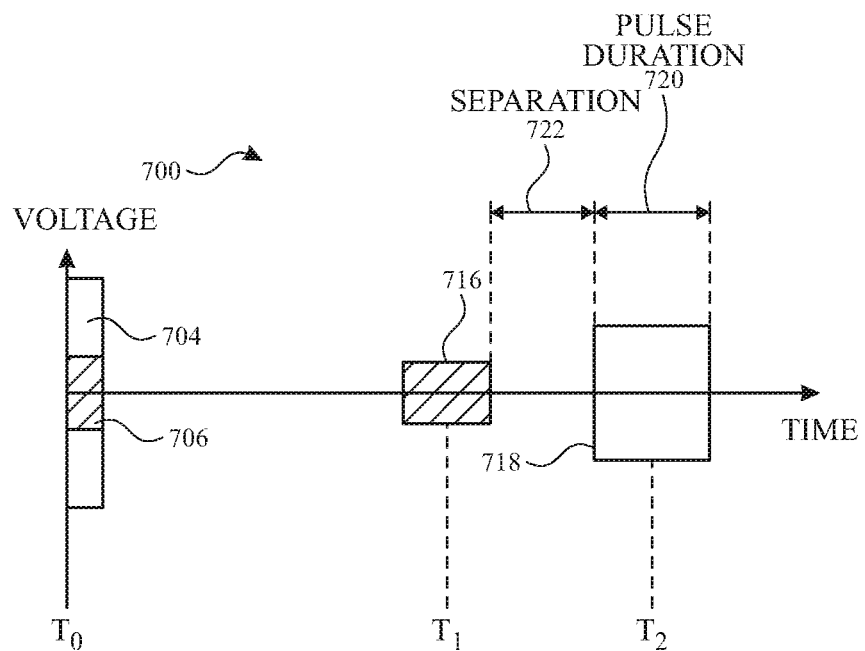
FIG. 7A illustrates a symbolic shear wave transducer reflected wave timing diagram with shear and compressional wave reflections separated in the time domain according examples of the disclosure.

FIG. 7A illustrates a symbolic shear wave transducer reflected wave timing diagram 700 with shear and compressional wave reflections separated in the time domain according examples of the disclosure. Note that all waves, amplitudes and timing shown in FIG. 7A are symbolic and not to scale. In the example of FIG. 7A, a shear wave transducer can generate both shear wave 704 and compressional wave 706 at time t0, and because of the greater velocity of the compressional wave, a round trip of first compressional wave reflection 716 can be received back at the shear wave transducer at time t1. Next, because of the slower velocity of shear wave 704, a round trip of first shear wave reflection 718 can be received back at the shear wave transducer at time t2. In the example of FIG. 7A, the center frequency of the ultrasonic shear wave transducer is 5 MHz, and there are three cycles in each ultrasonic pulse, resulting in a pulse duration 720 of 0.6 µs for shear wave reflection 718. In the example of FIG. 7A, the shear plate is made of glass with a thickness of 15 mm, resulting in a compressional wave velocity of 5.4 mm/µs and a shear wave velocity of 3.4 mm/µs. These velocities result in a compressional wave reflection round trip time t1 of 5.5 µs and a shear wave reflection round trip time t2 of 8.8 µs, ultimately resulting in a separation 722 between the compressional wave reflection and the shear wave reflection of 2.7 µs. With this separation, time windows can be chosen around the compressional wave reflection time of t1=5.5 µs and the shear wave reflection round trip time of t2=8.8 µs to measure these reflections with minimal interference from other reflections.

Figure 7B:
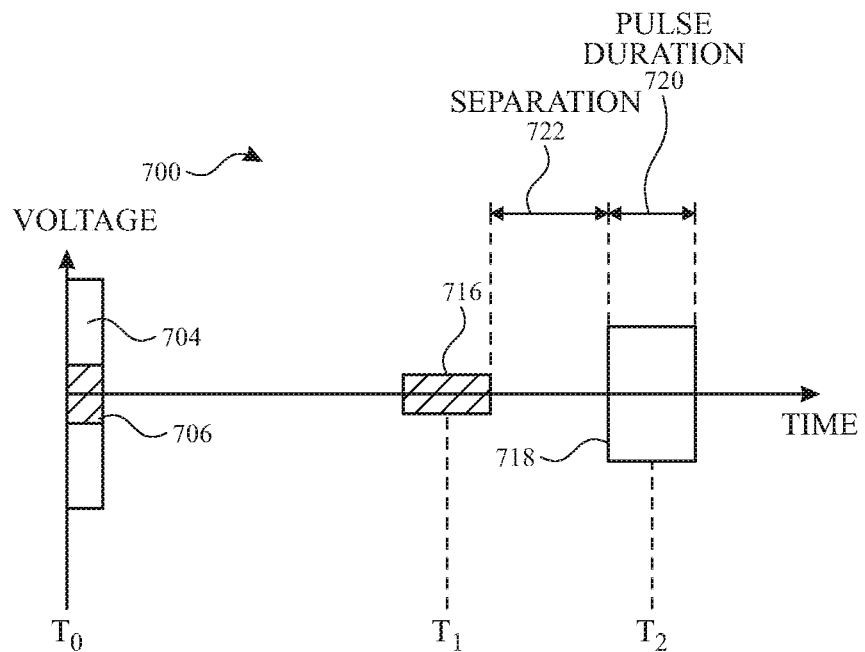
FIG. 7B illustrates another symbolic shear wave transducer reflected wave timing diagram with shear and compressional wave reflections separated in the time domain according examples of the disclosure.

FIG. 7B illustrates another symbolic shear wave transducer reflected wave timing diagram 700 with shear and compressional wave reflections separated in the time domain according examples of the disclosure. Note that all waves, amplitudes and timing shown in FIG. 7B are symbolic and not to scale. FIG. 7B is similar to FIG. 7A except that a lower center frequency is used. In the example of FIG. 7B, the center frequency of the ultrasonic shear wave transducer is 1.5 MHz, resulting in a pulse duration 720 of 2 µs for shear wave reflection 718. Thus, the reflected wave pulse durations in FIG. 7B are longer than the reflected wave pulse durations in FIG. 7A, which in general can increase the chance of reflection overlap. However, in the example of FIG. 7B, there is still a separation 722 between the compressional wave reflection and the shear wave reflection of 1.3 µs. With this separation, smaller time windows (as compared to FIG. 7A) can be chosen around the compressional wave reflection time of t1=5.5 µs and the shear wave reflection round trip time of t2=8.8 µs to measure these reflections with minimal interference from other reflections.

The examples of FIGS. 7A and 7B illustrate the general concept that the choice of ultrasonic stimulation frequency and the number of cycles in each ultrasonic pulse can serve to increase or decrease the reflected wave durations, resulting in shorter or longer time separations between reflected shear and compressional wave reflections.

Figure 8A:
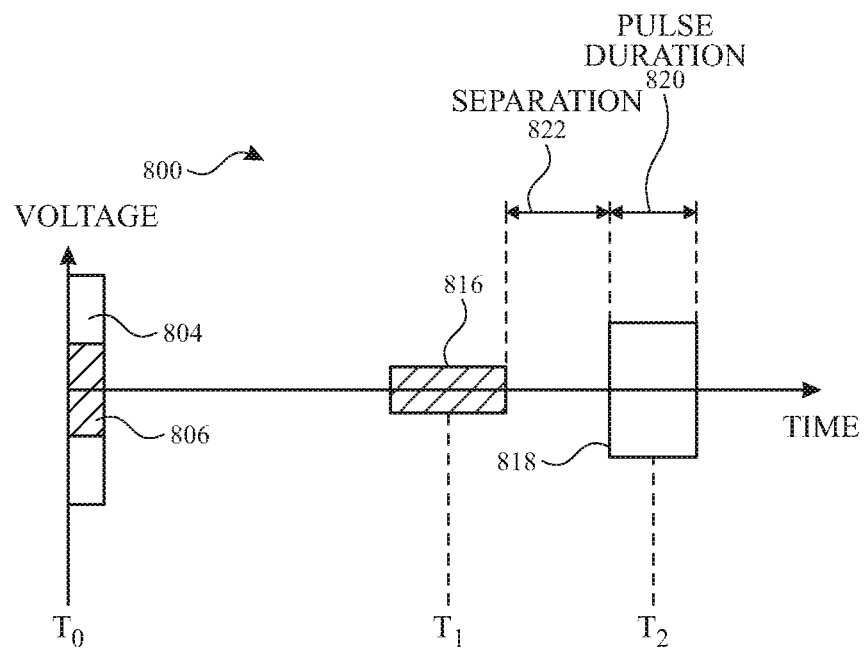
FIG. 8A illustrates yet another symbolic shear wave transducer reflected wave timing diagram with shear and compressional wave reflections separated in the time domain according examples of the disclosure.

FIG. 8A illustrates yet another symbolic shear wave transducer reflected wave timing diagram 800 with shear and compressional wave reflections separated in the time domain according examples of the disclosure. Note that all waves, amplitudes and timing shown in FIG. 8A are symbolic and not to scale. In the example of FIG. 8A, a shear wave transducer can generate both shear wave 804 and compressional wave 806 at time t0, and because of the greater velocity of the compressional wave, a first round trip of compressional wave reflection 816 can be received back at the shear wave transducer at time t1. Next, because of the slower velocity of shear wave 804, a first round trip of shear wave reflection 818 can be received back at the shear wave transducer at time t2. In the example of FIG. 8A, the center frequency of the ultrasonic shear wave transducer is 1.5 MHz, and there are three cycles in each ultrasonic pulse, resulting in a pulse duration 820 of 2 µs for shear wave reflection 718. In the example of FIG. 8A, the shear plate is made of glass with a thickness of 15 mm, resulting in a compressional wave velocity of 5.4 mm/µs and a shear wave velocity of 3.4 mm/µs. These velocities result in a compressional wave reflection round trip time t1 of 5.5 µs and a shear wave reflection round trip time t2 of 8.8 µs, ultimately resulting in a separation 822 between the compressional wave reflection and the shear wave reflection of 1.3 µs. With this separation, time windows can be chosen around the compressional wave reflection time of t1=5.5 µs and the shear wave reflection round trip time of t2=8.8 µs to measure these reflections with minimal interference from other reflections.

Figure 8B:
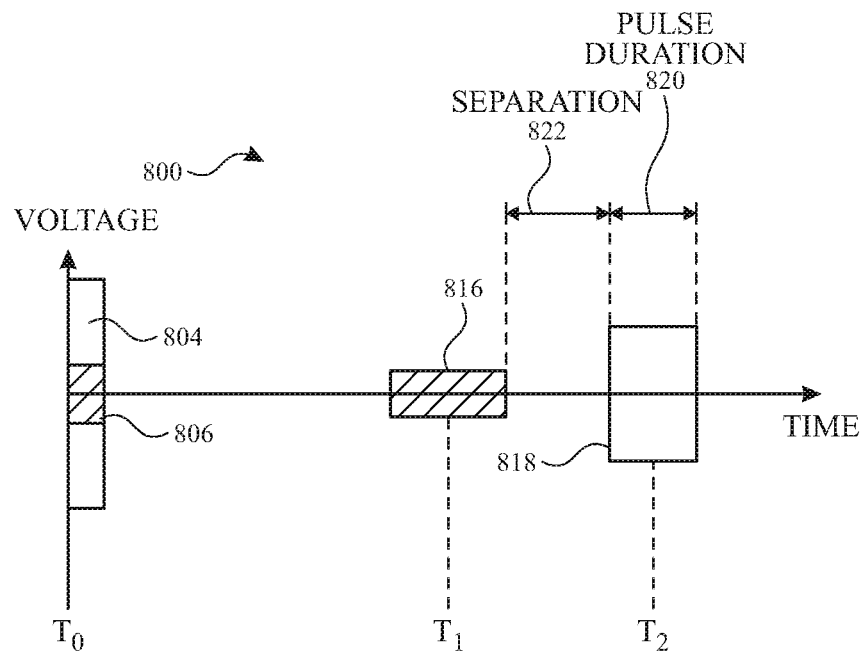
FIG. 8B illustrates yet another symbolic shear wave transducer reflected wave timing diagram with shear and compressional wave reflections separated in the time domain according examples of the disclosure.

FIG. 8B illustrates yet another symbolic shear wave transducer reflected wave timing diagram 800 with shear and compressional wave reflections separated in the time domain according examples of the disclosure. Note that all waves, amplitudes and timing shown in FIG. 8B are symbolic and not to scale. FIG. 8B is similar to FIG. 8A except that a thinner glass plate is used, necessitating the use of a higher center frequency in order to maintain adequate reflection separation. In the example of FIG. 8B, the shear plate is made of glass with a thickness of 1.5 mm, and the center frequency of the ultrasonic shear wave transducer is 15 MHz. The thinner sensing plate combined with the higher center frequency results in a compressional wave reflection round trip time t1 of only 0.55 µs and a shear wave reflection round trip time t2 of only 0.88 µs, which in general can reduce the reflection separation time. However, the higher center frequency also results in a pulse duration 820 of only 0.2 µs for shear wave reflection 818. Thus, the reflected wave pulse durations in FIG. 8B are shorter than the reflected wave pulse durations in FIG. 8A, which in general can decrease the chance of reflection overlap. In the example of FIG. 8B, there is still a separation between the compressional wave reflection and the shear wave reflection 822 of 0.13 µs. With this separation, smaller time windows (as compared to FIG. 8A) can be chosen around the compressional wave reflection time of t1=0.55 µs and the shear wave reflection round trip time of t2=0.88 µs to measure these reflections with minimal interference from other reflections.

The examples of FIGS. 8A and 8B illustrate the general concept that as thinner sensing plates are utilized, resulting in shorter reflection times as more closely spaced shear and compressional wave reflections, examples of the disclosure can compensate by increasing the center frequency of the ultrasonic shear wave transducer to shorten the reflection pulse width and maintain shear and compressional wave time separation. More generally, a given sensing plate material can result in a characteristic ultrasonic compressional wave velocity and a characteristic ultrasonic shear wave velocity. The thickness of that material can be selected to determine a round trip reflection distance and also the timing of the shear and compressional wave reflections (because of their known velocities). The material, and thickness of that material, can therefore be selected such that a first reflection from the ultrasonic shear wave received at a particular transducer is non-overlapping in time with respect to a first reflection from the ultrasonic compressional wave received at the particular transducer.

The examples of FIGS. 7A, 7B, 8A and 8B therefore illustrate that by careful selection of sensing plate thickness and ultrasonic shear wave transducer frequency, time durations between compressional wave and shear wave reflections can be obtained to enable the determination of time windows, within which the amplitude or energy of a shear wave reflection and a compressional wave reflection can be determined without significant interference from other reflections. These amplitudes or energy levels can then be used to determine whether a touch is present and whether water is present.

The previous examples discussed hereinabove have all utilized the first shear wave reflection and the second shear wave reflection to determine reflection amplitudes or energy levels and the presence of a touch or water. In some examples, first reflections can be advantageous because there are no other reflections or ringing occurring at that time (e.g., spurious waves from the transducer than interact with other objects or interfaces and reflect back to the transducer). Utilizing reflections other than the first reflections can also result in attenuated signals, because with two or more round trip reflections, the waves have interacted with multiple surfaces, interfaces and other imperfections due to diffraction.

However, in some examples using the second or third reflections (or other subsequent reflections) can be beneficial. These reflections can have more sensitivity to a touching object or water because they will have interacted with the top surface of the sensing plate multiple times, resulting in additional wave absorption by the object or water (depending on the type of wave). In addition, using downstream reflections can be beneficial for thin stackups, because in such configurations the first reflections can arrive very quickly, when the transducer electronics may still be ringing from transmitting, which can make those first reflections hard to discern. However, as noted above, finding time periods to measure these downstream reflections without corruption from other reflections can be difficult.

In examples of the disclosure, the sensing plate can be formed from glass, sapphire crystal, plastic and metal, among other materials. A key criteria of the material can be how much attenuation of the ultrasonic wave will result.

Although examples of the disclosure presented hereinabove have illustrated only a single ultrasonic shear wave transducer, in other examples of the disclosure an array of ultrasonic shear wave transducers can be employed to not only determine the presence of a touch or water, but also to determine a location of the touch or water over larger surfaces.

Figure 9:
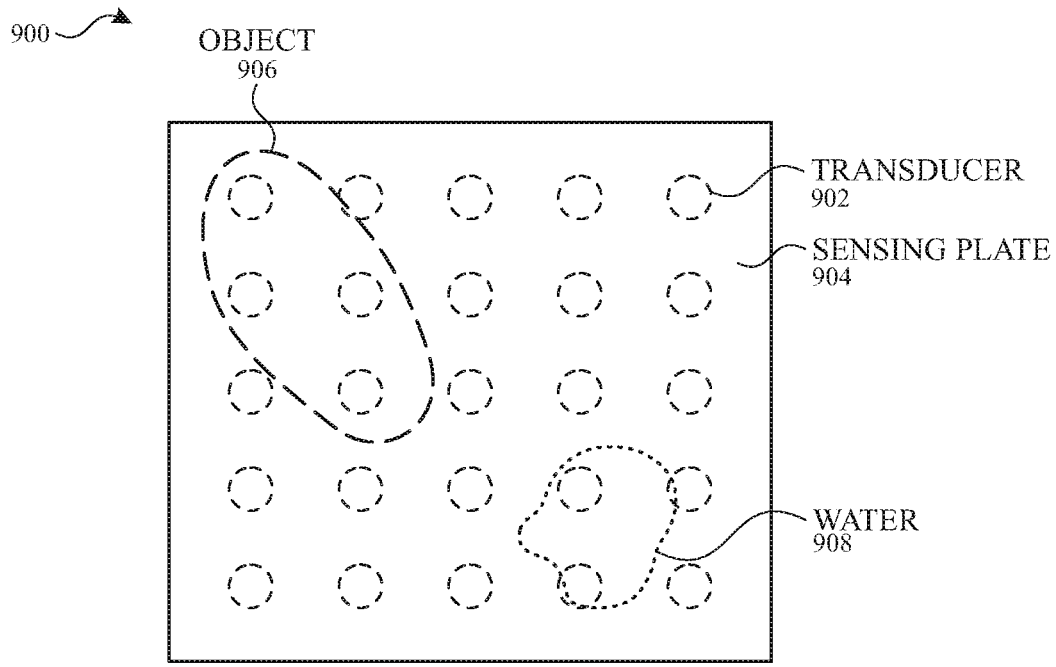
FIG. 9 illustrates a symbolic plan view of a touch-sensitive surface including an array of ultrasonic shear wave transducers according to examples of the disclosure.

FIG. 9 illustrates a symbolic plan view of a touch-sensitive surface 900 including an array of ultrasonic shear wave transducers 902 according to examples of the disclosure. In the example of FIG. 9, ultrasonic shear wave transducers 902 are located under sensing plate 904. Ultrasonic shear wave transducers 902 located under touching object 906 can detect the presence of the object using the shear and compressional wave reflections described above. Furthermore, the known locations of those ultrasonic shear wave transducers 902 that detect the presence of object 906 can further be used to calculate a location (e.g., a centroid) of the object and estimate touch boundaries of the object. Similarly, ultrasonic shear wave transducers 902 located under water droplet 908 can detect the presence of the droplet using the shear and compressional wave reflections described above. Furthermore, the known locations of those ultrasonic shear wave transducers 902 that detect the presence of droplet 908 can further be used to calculate a location (e.g., a centroid) of the droplet and estimate boundaries of the droplet.

Figure 10:
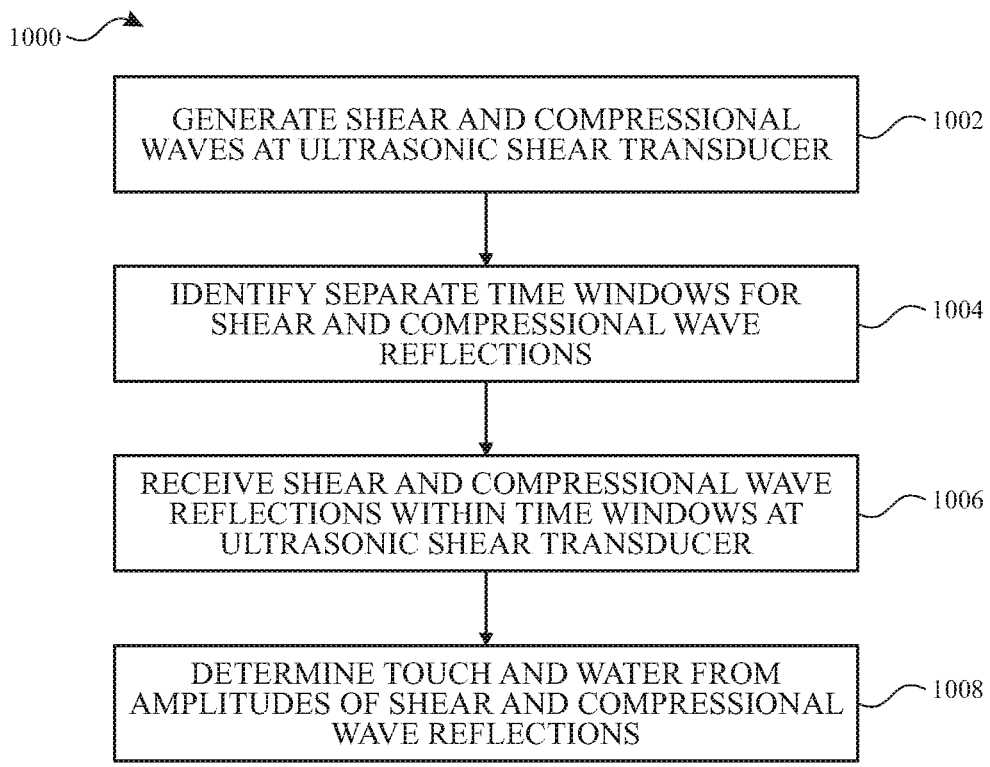
FIG. 10 illustrates a flowchart for ultrasonic water agnostic touch detection according to examples of the disclosure.

FIG. 10 illustrates flowchart 1000 for ultrasonic water-agnostic touch detection according to examples of the disclosure. In the example of FIG. 10, at 1002 shear and compressional waves are generated by an ultrasonic shear wave transducer and propagated through a sensing plate. At 1004, separate time windows for receiving shear wave reflections and compressional wave reflections are identified. At 1006, the shear wave reflections and compressional wave reflections are received at the ultrasonic shear wave transducer. At 1008, the presence or absence of a touch, and the presence of water (if any) can be determined based on the amplitudes or energy levels of the received shear wave and compressional wave reflections.

Therefore, according to the above, some examples of the disclosure are directed to a device comprising: a surface; an array of transducers coupled to the surface, each transducer in the array of transducers configured to generate an ultrasonic shear wave and an ultrasonic compressional wave and to receive a reflection of the ultrasonic shear wave and a reflection of the ultrasonic compressional wave during non-overlapping windows; and a processor coupled to the array of transducers configured to, for each transducer: in accordance with the reflection from the ultrasonic shear wave being less than a first threshold and the reflection from the ultrasonic compressional wave being less than a second threshold, determine an object in contact with a region of the surface corresponding to the transducer; in accordance with the reflection from the ultrasonic shear wave being greater than the first threshold and the reflection from the ultrasonic compressional wave being less than the second threshold, determine a liquid in contact with the region of the surface corresponding to the transducer; and in accordance with the reflection from the ultrasonic shear wave being greater than the first threshold and the reflection from the ultrasonic compressional wave being greater than the second threshold, determine no object in contact with the region of the surface corresponding to the transducer. Additionally or alternatively to one or more of the examples disclosed above, in some examples each transducer in the array of transducers is an ultrasonic shear wave transducer. Additionally or alternatively to one or more of the examples disclosed above, in some examples an x-direction is defined parallel to the surface and a z-direction is defined normal to the surface, each ultrasonic shear wave transducer comprising: first and second electrodes formed on a top and a bottom of the ultrasonic shear wave transducer in the z-direction; wherein a polling direction of the shear wave transducer is aligned along the x-direction. Additionally or alternatively to one or more of the examples disclosed above, in some examples the reflection from the ultrasonic shear wave is a first reflection of the ultrasonic shear wave, and the reflection from the ultrasonic compressional wave is a first reflection of the ultrasonic compressional wave. Additionally or alternatively to one or more of the examples disclosed above, in some examples the reflection from the ultrasonic shear wave is a reflection subsequent to a first reflection of the ultrasonic shear wave, and the reflection from the ultrasonic compressional wave is a reflection subsequent to a first reflection of the ultrasonic compressional wave. Additionally or alternatively to one or more of the examples disclosed above, in some examples the surface has a characteristic ultrasonic compressional wave velocity, a characteristic ultrasonic shear wave velocity and a thickness selected such that a first reflection from the ultrasonic shear wave received at a particular transducer is non-overlapping in time with respect to a first reflection from the ultrasonic compressional wave received at the particular transducer. Additionally or alternatively to one or more of the examples disclosed above, in some examples each transducer in the array of transducers is configured to generate a plurality of pulses, each pulse including a first number of cycles at a first frequency; wherein the first number of cycles and the first frequency are selected such that a first reflection from the ultrasonic shear wave received at a particular transducer is non-overlapping in time with respect to a first reflection from the ultrasonic compressional wave received at the particular transducer.

Some examples of the disclosure are directed to a method for detecting an object and water on a surface, comprising: generating an ultrasonic shear wave and an ultrasonic compressional wave from each transducer in an array of transducers; receiving a reflection of the ultrasonic shear wave and a reflection of the ultrasonic compressional wave during non-overlapping time windows; and for each transducer: in accordance with the reflection from the ultrasonic shear wave being less than a first threshold and the reflection from the ultrasonic compressional wave being less than a second threshold, determining an object in contact with a region of the surface corresponding to the transducer; in accordance with the reflection from the ultrasonic shear wave being greater than the first threshold and the reflection from the ultrasonic compressional wave being less than the second threshold, determining a liquid in contact with the region of the surface corresponding to the transducer; and in accordance with the reflection from the ultrasonic shear wave being greater than the first threshold and the reflection from the ultrasonic compressional wave being greater than the second threshold, determining no object in contact with the region of the surface corresponding to the transducer. Additionally or alternatively to one or more of the examples disclosed above, in some examples the method further comprises generating the ultrasonic shear wave and the ultrasonic compressional wave from each transducer using an ultrasonic shear wave transducer. Additionally or alternatively to one or more of the examples disclosed above, in some examples an x-direction is defined parallel to the surface and a z-direction is defined normal to the surface, and the method further comprises orienting each ultrasonic shear wave transducer such that a polling direction of the ultrasonic shear wave transducer is aligned along the x-direction. Additionally or alternatively to one or more of the examples disclosed above, in some examples the reflection from the ultrasonic shear wave is a first reflection of the ultrasonic shear wave, and the reflection from the ultrasonic compressional wave is a first reflection of the ultrasonic compressional wave. Additionally or alternatively to one or more of the examples disclosed above, in some examples the reflection from the ultrasonic shear wave is a reflection subsequent to a first reflection of the ultrasonic shear wave, and the reflection from the ultrasonic compressional wave is a reflection subsequent to a first reflection of the ultrasonic compressional wave. Additionally or alternatively to one or more of the examples disclosed above, in some examples the method further comprises selecting a material of the surface having a characteristic ultrasonic compressional wave velocity, a characteristic ultrasonic shear wave velocity, and a thickness such that a first reflection from the ultrasonic shear wave received at a particular transducer is non-overlapping in time with respect to a first reflection from the ultrasonic compressional wave received at the particular transducer. Additionally or alternatively to one or more of the examples disclosed above, in some examples the method further comprises generating the ultrasonic shear wave and the ultrasonic compressional wave from each transducer in the array of transducers with a plurality of pulses, each pulse including a first number of cycles at a first frequency; wherein the first number of cycles and the first frequency are selected such that a first reflection from the ultrasonic shear wave received at a particular transducer is non-overlapping in time with respect to a first reflection from the ultrasonic compressional wave received at the particular transducer.

Some examples of the disclosure are directed to a device comprising: means for propagating an ultrasonic shear wave and an ultrasonic compressional wave through a surface material from each location in an array; means for receiving a reflection of the ultrasonic shear wave and a reflection of the ultrasonic compressional wave from each location in the array during non-overlapping time windows; and for each means for propagating: in accordance with the reflection from the ultrasonic shear wave being less than a first threshold and the reflection from the ultrasonic compressional wave being less than a second threshold, determining an object in contact with a region of the surface corresponding to the transducer; in accordance with the reflection from the ultrasonic shear wave being greater than the first threshold and the reflection from the ultrasonic compressional wave being less than the second threshold, determining a liquid in contact with the region of the surface corresponding to the transducer; and in accordance with the reflection from the ultrasonic shear wave being greater than the first threshold and the reflection from the ultrasonic compressional wave being greater than the second threshold, determining no object in contact with the region of the surface corresponding to the transducer. Additionally or alternatively to one or more of the examples disclosed above, in some examples the means for generating the ultrasonic shear wave and the ultrasonic compressional wave from each location in the array comprise an ultrasonic shear wave transducer. Additionally or alternatively to one or more of the examples disclosed above, in some examples an x-direction is defined parallel to the surface and a z-direction is defined normal to the surface, and each ultrasonic shear wave transducer is oriented such that a polling direction of the ultrasonic shear wave transducer is aligned along the x-direction. Additionally or alternatively to one or more of the examples disclosed above, in some examples the reflection from the ultrasonic shear wave is a first reflection of the ultrasonic shear wave, and the reflection from the ultrasonic compressional wave is a first reflection of the ultrasonic compressional wave. Additionally or alternatively to one or more of the examples disclosed above, in some examples the reflection from the ultrasonic shear wave is a reflection subsequent to a first reflection of the ultrasonic shear wave, and the reflection from the ultrasonic compressional wave is a reflection subsequent to a first reflection of the ultrasonic compressional wave. Additionally or alternatively to one or more of the examples disclosed above, in some examples the surface material has a characteristic ultrasonic compressional wave velocity, a characteristic ultrasonic shear wave velocity, and a thickness such that a first reflection from the ultrasonic shear wave received at a particular transducer is non-overlapping in time with respect to a first reflection from the ultrasonic compressional wave received at the particular transducer. Additionally or alternatively to one or more of the examples disclosed above, in some examples the means for propagating configured for generating the ultrasonic shear wave and the ultrasonic compressional wave from each transducer in the array of transducers with a plurality of pulses, each pulse including a first number of cycles at a first frequency; wherein the first number of cycles and the first frequency are selected such that a first reflection from the ultrasonic shear wave received at a particular transducer is non-overlapping in time with respect to a first reflection from the ultrasonic compressional wave received at the particular transducer.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. A device comprising:
   a surface;
   an array of transducers coupled to the surface, each transducer in the array of transducers configured to generate an ultrasonic shear wave and an ultrasonic compressional wave and to receive a reflection of the ultrasonic shear wave and a reflection of the ultrasonic compressional wave during non-overlapping windows; and
   a processor coupled to the array of transducers configured to, for each transducer:
      in accordance with the reflection from the ultrasonic shear wave being less than a first threshold and the reflection from the ultrasonic compressional wave being less than a second threshold, determine an object in contact with a region of the surface corresponding to the transducer;
      in accordance with the reflection from the ultrasonic shear wave being greater than the first threshold and the reflection from the ultrasonic compressional wave being less than the second threshold, determine a liquid in contact with the region of the surface corresponding to the transducer; and
      in accordance with the reflection from the ultrasonic shear wave being greater than the first threshold and the reflection from the ultrasonic compressional wave being greater than the second threshold, determine no object in contact with the region of the surface corresponding to the transducer.

2. The device of claim 1, wherein each transducer in the array of transducers is an ultrasonic shear wave transducer.

3. The device of claim 2, wherein an x-direction is defined parallel to the surface and a z-direction is defined normal to the surface, each ultrasonic shear wave transducer comprising:
   first and second electrodes formed on a top and a bottom of the ultrasonic shear wave transducer in the z-direction;
   wherein a polling direction of the ultrasonic shear wave transducer is aligned along the x-direction.

4. The device of claim 1, wherein the reflection from the ultrasonic shear wave is a first reflection of the ultrasonic shear wave, and the reflection from the ultrasonic compressional wave is a first reflection of the ultrasonic compressional wave.

5. The device of claim 1, wherein the reflection from the ultrasonic shear wave is a reflection subsequent to a first reflection of the ultrasonic shear wave, and the reflection from the ultrasonic compressional wave is a reflection subsequent to a first reflection of the ultrasonic compressional wave.

6. The device of claim 1, the surface having a characteristic ultrasonic compressional wave velocity, a characteristic ultrasonic shear wave velocity and a thickness selected such that a first reflection from the ultrasonic shear wave received at a particular transducer is non-overlapping in time with respect to a first reflection from the ultrasonic compressional wave received at the particular transducer.

7. The device of claim 1, each transducer in the array of transducers configured to generate a plurality of pulses, each pulse including a first number of cycles at a first frequency;
   wherein the first number of cycles and the first frequency are selected such that a first reflection from the ultrasonic shear wave received at a particular transducer is non-overlapping in time with respect to a first reflection from the ultrasonic compressional wave received at the particular transducer.

8. A method for detecting an object and water on a surface, comprising:
   generating an ultrasonic shear wave and an ultrasonic compressional wave from each transducer in an array of transducers;
   receiving a reflection of the ultrasonic shear wave and a reflection of the ultrasonic compressional wave during non-overlapping time windows; and
   for each transducer:
      in accordance with the reflection from the ultrasonic shear wave being less than a first threshold and the reflection from the ultrasonic compressional wave being less than a second threshold, determining an object in contact with a region of the surface corresponding to the transducer;
      in accordance with the reflection from the ultrasonic shear wave being greater than the first threshold and the reflection from the ultrasonic compressional wave being less than the second threshold, determining a liquid in contact with the region of the surface corresponding to the transducer; and
      in accordance with the reflection from the ultrasonic shear wave being greater than the first threshold and the reflection from the ultrasonic compressional wave being greater than the second threshold, determining no object in contact with the region of the surface corresponding to the transducer.

9. The method of claim 8, further comprising generating the ultrasonic shear wave and the ultrasonic compressional wave from each transducer using an ultrasonic shear wave transducer.

10. The method of claim 9, wherein an x-direction is defined parallel to the surface and a z-direction is defined normal to the surface, further comprising orienting each ultrasonic shear wave transducer such that a polling direction of the ultrasonic shear wave transducer is aligned along the x-direction.

11. The method of claim 8, wherein the reflection from the ultrasonic shear wave is a first reflection of the ultrasonic shear wave, and the reflection from the ultrasonic compressional wave is a first reflection of the ultrasonic compressional wave.

12. The method of claim 8, wherein the reflection from the ultrasonic shear wave is a reflection subsequent to a first reflection of the ultrasonic shear wave, and the reflection from the ultrasonic compressional wave is a reflection subsequent to a first reflection of the ultrasonic compressional wave.

13. The method of claim 8, further comprising selecting a material of the surface having a characteristic ultrasonic compressional wave velocity, a characteristic ultrasonic shear wave velocity, and a thickness such that a first reflection from the ultrasonic shear wave received at a particular transducer is non-overlapping in time with respect to a first reflection from the ultrasonic compressional wave received at the particular transducer.

14. The method of claim 8, further comprising generating the ultrasonic shear wave and the ultrasonic compressional wave from each transducer in the array of transducers with a plurality of pulses, each pulse including a first number of cycles at a first frequency;
  wherein the first number of cycles and the first frequency are selected such that a first reflection from the ultrasonic shear wave received at a particular transducer is non-overlapping in time with respect to a first reflection from the ultrasonic compressional wave received at the particular transducer.

15. A device comprising:
  means for propagating an ultrasonic shear wave and an ultrasonic compressional wave through a surface from each location in an array;
  means for receiving a reflection of the ultrasonic shear wave and a reflection of the ultrasonic compressional wave from each location in the array during non-overlapping time windows; and
  for each means for propagating:
    in accordance with the reflection from the ultrasonic shear wave being less than a first threshold and the reflection from the ultrasonic compressional wave being less than a second threshold, determining an object in contact with a region of the surface corresponding to the means for propagating;
    in accordance with the reflection from the ultrasonic shear wave being greater than the first threshold and the reflection from the ultrasonic compressional wave being less than the second threshold, determining a liquid in contact with the region of the surface corresponding to the means for propagating; and
    in accordance with the reflection from the ultrasonic shear wave being greater than the first threshold and the reflection from the ultrasonic compressional wave being greater than the second threshold, determining no object in contact with the region of the surface corresponding to the means for propagating.

16. The device of claim 15, the means for propagating the ultrasonic shear wave and the ultrasonic compressional wave from each location in the array comprising an ultrasonic shear wave transducer.

17. The device of claim 16, wherein an x-direction is defined parallel to the surface and a z-direction is defined normal to the surface, and each ultrasonic shear wave transducer is oriented such that a polling direction of the ultrasonic shear wave transducer is aligned along the x-direction.

18. The device of claim 15, wherein the reflection from the ultrasonic shear wave is a first reflection of the ultrasonic shear wave, and the reflection from the ultrasonic compressional wave is a first reflection of the ultrasonic compressional wave.

19. The device of claim 15, wherein the reflection from the ultrasonic shear wave is a reflection subsequent to a first reflection of the ultrasonic shear wave, and the reflection from the ultrasonic compressional wave is a reflection subsequent to a first reflection of the ultrasonic compressional wave.

20. The device of claim 15, the surface having a characteristic ultrasonic compressional wave velocity, a characteristic ultrasonic shear wave velocity, and a thickness such that a first reflection from the ultrasonic shear wave received at a particular transducer is non-overlapping in time with respect to a first reflection from the ultrasonic compressional wave received at the particular transducer.

21. The device of claim 15, the means for propagating configured for generating the ultrasonic shear wave and the ultrasonic compressional wave from each transducer in the array of transducers with a plurality of pulses, each pulse including a first number of cycles at a first frequency;
  wherein the first number of cycles and the first frequency are selected such that a first reflection from the ultrasonic shear wave received at a particular transducer is non-overlapping in time with respect to a first reflection from the ultrasonic compressional wave received at the particular transducer.

* * * * *